Dec. 27, 1966  D. M. BASSET  3,294,145
SPOKING JIG
Filed Oct. 24, 1965  3 Sheets-Sheet 1
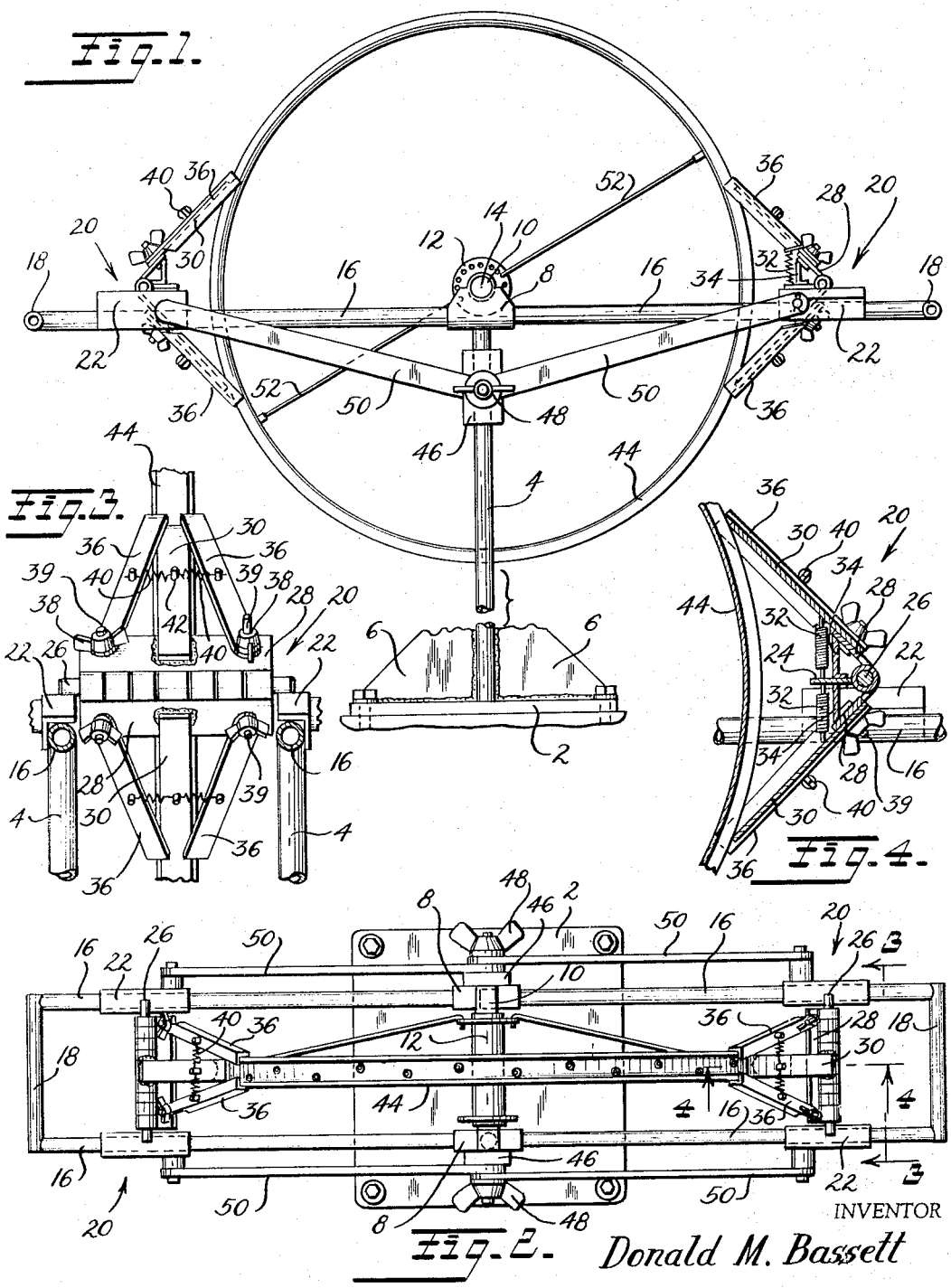
INVENTOR
Donald M. Bassett
BY
Bacon & Thomas
ATTORNEYS

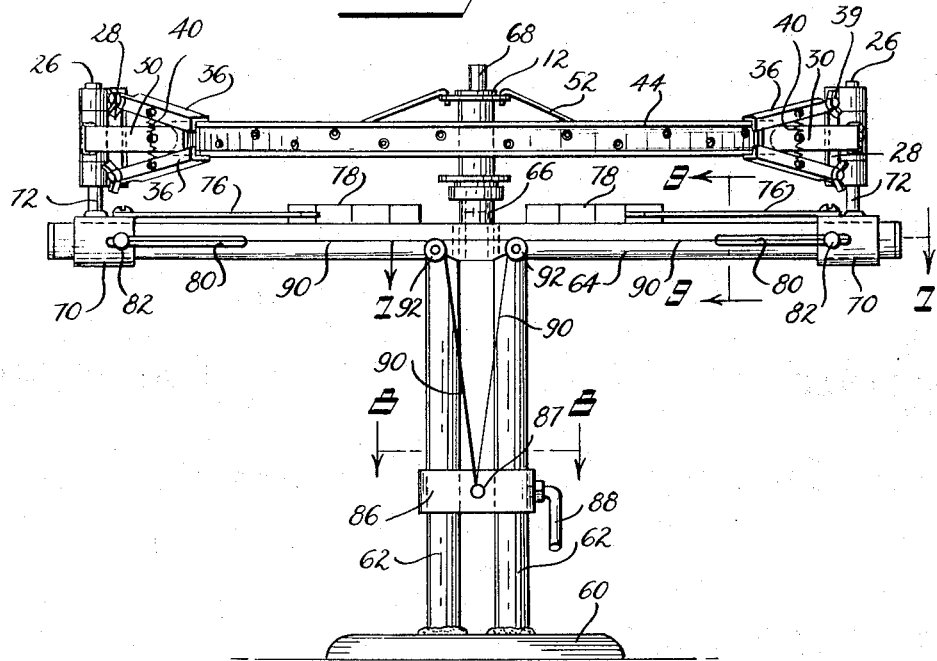
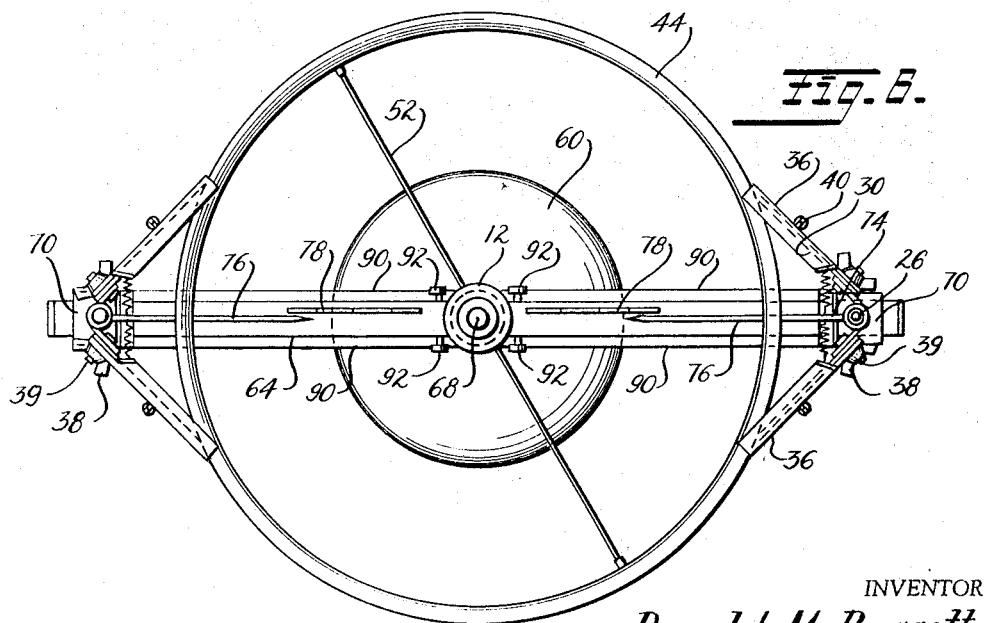

INVENTOR
Donald M. Bassett
BY
Bacon & Thomas
ATTORNEYS

United States Patent Office 3,294,145
Patented Dec. 27, 1966

3,294,145
SPOKING JIG
Donald M. Basset, 410 W. Holly Ave.,
Pitman, N.J. 08071
Filed Oct. 24, 1965, Ser. No. 504,384
5 Claims. (Cl. 157—1.5)

This invention relates to a jig for holding a hub and rim of a wheel, for example, a bicycle wheel, in concentric relation while spokes are mounted to join the hub to the rim. The invention is also applicable to previously assembled wheels where it is desired to adjust the spokes to bring a rim and hub into true concentricity.

In general, the invention comprises a support for holding a hub for rotation about a fixed axis and rim engaging means movable toward and from said axis to engage a rim and hold the same in concentric relation to the hub axis while spokes are being applied. The rim engaging means generally consist of a pair of slidable carriers on opposite sides of the hub holder and each provided with at least a pair of rim engaging elements. Means are provided for moving the carriers through equal distances whereby the rim engaging elements are all maintained at the same radial distance from the hub axis. The rim engaging elements are yieldably mounted on their carriers for limited displacement for indicating portions of a wheel rim that may be nonconcentric to the hub and/or axially warped.

It is, therefore, a principal object of this invention to provide a jig of the type set forth that is simple in construction and operation, involves a minimum number of parts, and while is efficient in operation and capable of holding a wheel and rim in the desired relationship while spokes are applied and which also may be used as a gauge for checking concentricity and trueness of an assembled wheel.

Other and additional objects and advantages will become apparent as the description proceeds with reference to the accompanying drawings wherein:

FIG. 1 is a side elevational view of one embodiment of the present invention;

FIG. 2 is a top plan view of the embodiment of FIG. 1;

FIG. 3 is an enlarged fragmentary sectional view taken on the line 3—3 of FIG. 2;

FIG. 4 is an enlarged fragmentary sectional view taken on the line 4—4 of FIG. 2;

FIG. 5 is a side elevational view of a second embodiment of the invention;

FIG. 6 is a top plan view of the embodiment of FIG. 5;

Figure 7:
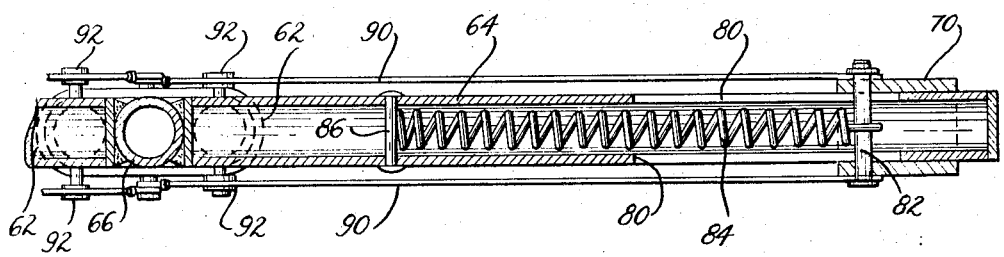
FIG. 7 is an enlarged fragmentary sectional view taken on the line 7—7 of FIG. 5.
Figure 8:
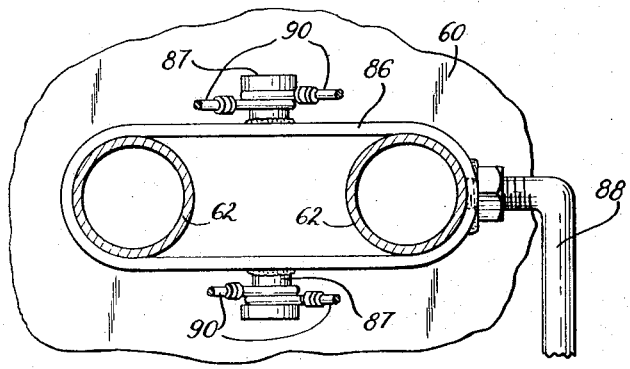
FIG. 8 is an enlarged fragmentary sectional view taken on the line 8—8 of FIG. 5.

Referring first to the embodiment of FIGS. 1 to 4, the device is provided with a base plate 2 adapted to be secured to or rested on any suitable supporting surface. Extending upwardly from the base plate 2 is a pair of upstanding posts 4 braced relative to the base plate by such means as gusset plates 6 welded thereto and to the base. At their upper ends the posts 4 are provided with hub supporting cradles or the like 8 adapted to support a stub axle 10 on which a wheel hub 12 is rotatably mounted. Thus, the cradles 8 support the hub 12 for rotation about a fixed axis 14.

Extending laterally on opposite sides from the cradles 8 are pairs of guide rails 16. The rails 16 extend in parallel relation and are joined in their outer ends by cross-bracing members 18, welded or otherwise secured to the ends of the rails 16. A pair of carriages generally designated at 20 are provided for sliding movement along the pairs of rails 16. Since both carriages are identical only one will be described in detail. Each carriage comprises a pair of right-angle slide members 22 joined by a cross plate 24 carrying a portion of a hinge device to be described. The slide members 22 are each provided with a flange slidably engaging the outer edge of a corresponding guide rail 16 and an upper flange resting on the upper surface thereof (see FIG. 3). The cross plate 24 spans and is welded to the slide members 22 and unites them into a single unit. The hinge device previously referred to includes a hinge pin 26 welded at its ends to the slide members 22 and a pair of hinge leafs 28 whereby each hinge leaf is pivotally mounted about the axis of pin 26 for swinging movement relative to a carriage 20. Extending radially from each hinge leaf 28 is a rigid arm 30. A pair of tension springs 32 are connected respectively to the arms 30 and cross plate 24 so as to urge both arms 30 to swing inwardly toward each other and to swing their free ends toward the axis 14. The cross plate 24 is also provided with laterally extending flange means 34 arranged to engage the arms 30 and limit their inward movement so that the outer ends thereof are equal distances from the axis 14. A pair of swingable arms 36 is pivoted to the lateral end portions of each hinge leaf 28 for swinging movement in the plane of the hinge leafs, as best seen in FIG. 3. Wing nuts 38 are provided on pivot pins 39 whereby the arms 36 may be locked against swinging movement. Springs 40 are each secured at one end to a respective arm 36 and at the other end to a pin 42 on rigid arm 30 whereby the arms 36 are constantly urged to swing inwardly toward each other. Each of the arms 36 is of right-angle shape so as to provide a flange portion engageable with the periphery of a wheel rim 44 and a side flange engageable with the adjacent side edge of the rim 44.

A pair of slide devices 46 are each slidably mounted on the respective posts 4 and are provided with wing nut devices 48 whereby they may be clamped in any desired position along their respective post 4. Links 50 of equal length are pivotally connected to the slide devices 46 and the carriers 20 so that vertical movement of the slide devices 46 on posts 4 will move the carriers 20 toward and from the axis 14 through equal distances whereby the rim engaging ends of the arms 36 are all maintained at the same distance from axis 14.

From the structure thus far described it will be apparent that a hub 20 may be mounted on the cradle 8 in the manner described and a wheel rim 44 may be held generally in the position shown whereupon the slide device 46 may be moved downwardly sufficiently to cause the ends of arms 36 to engage the rim 44 at peripherally spaced points. The carriages 20 will not be moved inwardly far enough to cause the arms 36 to swing about hinge axis 26 but only far enough to engage the wheel rim while the spring leafs 28 are held in abutment with stops 34 by the springs 32. The springs 32 are sufficiently strong to hold the wheel rim 44 in concentric relation to the hub 12. With the parts thus positioned, wheel spokes 52 may be successively and progressively installed while the hub and rim are rotated about the axis 14. Such rotation is possible since the arms 36 only slidably engage the wheel rim. After all spokes are installed, further rotation of the wheel about the axis 14 will indicate whether or not the rim is truly concentric to the hub and whether or not any portions thereof are axially distorted. It is contemplated that installation of the spokes 52 will include tensioning the same, in the well known manner, to about the desired final tension although this is preferably done progressively after all spokes are initially put in place. Upon rotation of the wheel, any nonconcentricity thereof will be indicated by one or more of the pairs of arms 36 being caused to swing about the hinge axis 26 so that their outer ends move generally radial to the axis 14 and adjustment of spoke tension to correct the nonconcentricity is a simple matter. Likewise, any swinging of the individual arms 36 about the axes of pivot pins 39 by which they are mounted on hinge leafs 28, in a direction generally parallel to axis 14, will also indicate that that portion of the wheel rim is axially distorted and further adjustment of spoke tension to correct that distortion may be made, also in a well known manner.

The second embodiment of the invention shown in FIGS. 5 through 9 differs from that of FIG. 1 essentially in providing a hub supporting means to hold the axis 14 vertical rather than horizontal, as shown in FIG. 1. The rim engaging means also hold the same in a horizontal plane rather than in a vertical plane. Parts of elements of the embodiment of FIGS. 5 through 9, which are identical in construction to corresponding parts of the embodiment of FIG. 1, bear the same reference numerals and will not be further described. It is to be noted, however, that the operation and use of this second embodiment is identical to that described with reference to FIG. 1.

In the second embodiment of the invention, a base 60 has a pair of upstanding posts 62 welded or otherwise secured thereto. A transverse tubular guide rail 64 is welded to the upper ends of the posts 62 and extend horizontally in opposite directions therefrom. The tubular guide 64 is provided with a hub supporting member 66 at about its midpoint, which device supports a stub axle 68 upon which the wheel hub 12 may be rotatably mounted for rotation about the fixed axis of axle 68. Identical slide carriers 70 telescopically engage the tubular guide rail 64 for sliding movement therealong. Each carrier 70 is provided with an upstanding bracket or the like 72 corresponding in function to the cross plate 24 of the first embodiment. This bracket supports the hinge pin 26 and a fixed plate 74 corresponding to the plates 24 of the first embodiment and to which the same springs and stop means are secured. The swingable arms 36 are mounted for movement about the hinge pins 26 and about the pivot pins 39 previously described in exactly the same manner as described with reference to the first embodiment and they function in the same manner.

Each slidable carrier 70 is provided with an indicator or pointer 76 cooperating with a suitable scale 78 on the tubular guide rail 64 to indicate the diameter of the wheel and to indicate whether or not the carriers are positioned equal distances from the axis of shaft 68. The guide tube 64 is provided with pairs of opposed longitudinal slots 80 adjacent its opposite ends and through which a cross pin 82 extends. The cross pin 82 passes through the sides of the carriers 70 whereby to hold the latter against rotation about the axis of tubular rail 64 while at the same time permitting sliding movement therealong. Within the hollow interior of the guide tube 64, a spring 84 is positioned which abuts at one end against a fixed pin 86 and at its other end abuts the pin 82 previously described. Thus, the springs 84 constantly urge the carriers 70 to move outwardly away from the hub axis.

Figure 9:
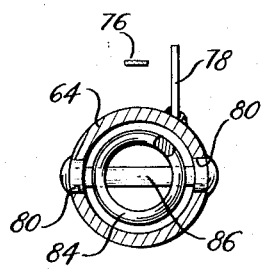
FIG. 9 is an enlarged fragmentary sectional view taken on the line 9—9 of FIG. 5.

A slide device 86 slidably embraces the upstanding posts 62 and is provided with a suitable clamping means 88 whereby it can be clamped in any desired position of movement along the posts 62. Secured to opposite sides of the slide device 86 are pins 87 to which pairs of flexible cables 90 are connected and which are trained upwardly and over guide pulleys or rollers 92, secured to the sides of guide rail 64 and thence outwardly where their opposite ends are secured to the carriers 70, as best shown in FIG. 7. Thus, downward movement of the slide device 86 will pull all four cables equal amounts and thus cause the carriers 70 to move inwardly toward the hub axis through equal distances. Likewise, upward movement of the slide device 86 will release the carriers 70 to the action of springs 84 whereby both carriers are moved outwardly through equal distances, thus maintaining the rim engaging ends of the arms 36 always spaced equal distances from the axis of hub 12. The manner of using the jig of the embodiment shown in FIGS. 5 and 9 is the same as that described with reference to FIGS. 1 to 4 and need not be repeated here.

While a limited number of specific embodiments of the invention have been shown and described, it is to be understood that the same are merely illustrative of the principles of the invention and that other embodiments may be resorted to within the scope of the appended claims.

I claim:

1. A jig for a wheel having a hub, a rim and adjustable spokes connecting said rim and hub, comprising: a hub mount for supporting a wheel hub for rotation about a fixed axis; a plurality of wheel rim engaging and supporting means; means supporting said rim engaging means for movement toward and from said axis; and actuating means for simultaneously moving said rim engaging means through equal distances whereby all said rim engaging means are at the same distance from said axis, said rim engaging means being mounted on their supporting means for yieldable movement thereon in a direction generally radial to said axis whereby to indicate a non-concentric portion of said rim.

2. A jig for a wheel having a hub, a rim and adjustable spokes connecting said rim and hub, comprising: a hub mount for supporting a wheel hub for rotation about a fixed axis; a plurality of wheel rim engaging and supporting means for movement toward and from said axis; and actuating means for simultaneously moving said rim engaging means through equal distances whereby all said rim engaging means are at the same distance from said axis, said rim engaging means being mounted on their supporting means for yieldable movement in a direction generally parallel to said axis whereby to indicate an axially displaced portion of said rim.

3. A jig for a wheel having a hub; a rim and adjustable spokes connecting said rim and hub, comprising: a hub mount for supporting a wheel hub for rotation about a fixed axis; guides extending generally radially from said axis on opposite sides thereof; a carrier slidable along each guide; equally laterally spaced rim engaging means carried by each carrier; means for simultaneously moving said carriers toward and from said axis through equal distances to maintain all said rim engaging means at equal distances from said axis, said rim engaging means on each carrier comprising a pair of arms pivotally mounted at one end on their carrier to swing in the plane of said rim; yieldable means urging the other end of each arm to swing inwardly toward said axis; and stop means on said carrier, limiting the inward swinging movement of each arm to a position where the said other ends of all said arms are equidistant from said axis.

4. A jig as defined in claim 3 wherein each of said arms further comprises a pair of relatively movable elements mounted for movement toward and from each other in a direction generally parallel to said axis; said elements each having a portion for slidably engaging the periphery of a wheel rim and a portion engageable with a side of said rim; and means urging said elements toward each other.

5. A jig for a wheel having a hub; a rim and adjustable spokes connecting said rim and hub, comprising: a hub mount for supporting a wheel hub for rotation about a fixed axis; guides extending generally radially from said axis on opposite sides thereof; a carrier slidable along each guide; equally laterally spaced rim engaging means carried by each carrier; means for simultaneously moving said carriers toward and from said axis through equal distances to maintain all said rim engaging means at equal distances from said axis; upright post means; said hub mount being positioned at the upper end of said post means and said guides extending horizontally therefrom; said means for simultaneously moving said carriers including a slide device slidable along said post means; means for clamping said slide device to said post means in any selected position therealong, means drivingly connecting said slide device and each of said carriers, said last-named means comprising: links of equal length pivotally connecting said slide device and each of said carriers and furthe comprising flexible elements, connected to said slide device and to each of said carriers for moving said carriers toward said axis; and spring means for moving said carriers away from said axis.

References Cited by the Examiner

UNITED STATES PATENTS

| 560,354 | 5/1896 | Hain. | |
| 776,831 | 12/1904 | Geddes. | |
| 2,569,788 | 10/1951 | Weaver | 157—1.24 |
| 2,569,789 | 10/1951 | Weaver | 157—1.24 |
| 2,764,194 | 9/1956 | Schultz. | |

FOREIGN PATENTS 25,391 12/1931 Netherlands.

GRANVILLE Y. CUSTER, JR., *Primary Examiner.*